United States Patent [19]

LeBegue et al.

[11] Patent Number: 4,641,888
[45] Date of Patent: Feb. 10, 1987

[54] MATERIAL GATHERING DEVICE FOR A MINING MACHINE

[75] Inventors: Maurice K. LeBegue, Argillite; Henry E. Wilson, Ashland, both of Ky.

[73] Assignee: National Mine Service Company, Pittsburgh, Pa.

[21] Appl. No.: 722,700

[22] Filed: Apr. 12, 1985

[51] Int. Cl.$^4$ ............................................. E21C 35/20
[52] U.S. Cl. ........................................ 299/64; 299/76; 198/514
[58] Field of Search ....................... 299/64, 67, 68, 76, 299/78; 198/512, 514, 515, 520, 518

[56] References Cited

U.S. PATENT DOCUMENTS

| | | | |
|---|---|---|---|
| 1,582,247 | 4/1926 | Burch | 198/514 |
| 2,793,732 | 5/1957 | Russell | 198/514 X |
| 2,885,056 | 5/1959 | McElhatten | 198/514 |
| 3,277,993 | 10/1966 | Arndt | 198/514 |
| 3,362,518 | 1/1968 | Sibley | 198/514 |
| 4,056,189 | 11/1977 | Freed, Jr. | 198/514 |

Primary Examiner—Stephen J. Novosad
Assistant Examiner—Michael A. Goodwin
Attorney, Agent, or Firm—Stanley J. Price, Jr.

[57] ABSTRACT

An improved material gathering device is for a mining machine or the like of the type which includes a mobile body supporting a mining head at a forward end thereof for dislodging material from a mine face. A gathering platform is on the mobile body adjacent and below the mining head for receipt of the dislodged material thereon. An endless conveyor extends longitudinally of the mobile body to convey the dislodged material away from the forward end to the rearward end of the mobile body. A pair of oscillating arms are on transversely opposite sides of the gathering platform and are driven by a gear train including a transversely extending shaft to cause the arms to feed the dislodged material onto the endless conveyor. The endless conveyor includes a sprocket and drive shaft at a forward end thereof to cause the endless conveyor to extend into the gathering platform to terminate near a forward edge thereof. The drive shaft for the endless conveyor is coupled by gears to the transversely extending shaft of the pair of oscillating arms.

4 Claims, 6 Drawing Figures

MATERIAL GATHERING DEVICE FOR A MINING MACHINE

BACKGROUND OF THE INVENTION

1. Field of the Invention

This invention relates to an improved material gathering device for a minimg machine and, more specifically, to such a gathering device which includes an endless conveyor having a forward end extending into a platform for gathering material dislodged from a mine face by a mining head of the machine.

2. Description of the Prior Art

It is well known to provide mining machines or the like of the type which include a mobile body supporting a mining head at a forward end thereof for dislodging material from a mine face. The movable body often includes a gathering platform adjacent and below the mining head for receipt of the dislodged material thereon. Further, to remove the dislodged material from the gathering platform, a longitudinally extending, endless conveyor is usually employed to convey dislodged material away from the forward end to a rearward end of the mobile body. A pair of oscillating arms on opposite sides of the gathering platform is frequently used to feed the dislodged material onto the endless conveyor.

U.S. Pat. Nos. 3,157,438; 3,680,920; and 4,296,856 disclose such mining machines and appear to have endless conveyors which are driven at a forward end thereof by the same general means which provides power to the pair of oscillating arms. As a result, however, the forward end of the endless conveyor appears to terminate between the oscillating arms and, therefore, leaves a significant area on the gathering platform forward thereof for the collection of dislodged material which can only be rearwardly moved through the action of the oscillating arms. Depending on the efficiency of the oscillating arms, it is possible for a significant amount of dislodged material to gather in this area which amount could interfere with forward movement fo the mining machine and continued and effective operation of the mining head against the mine face. Although in some instances it would be possible for the oscillating arms to be designed and configured to minimize the collection of dislodged material in this area, the required work load on the oscillating arms for this purpose could effect the overall power requirements for their operation.

Although U.S. Pat. No. 3,190,698 appears to disclose a mining machine having a forwardly extending endless conveyor means, the gathering platform on which it is mounted terminates at a location rearwardly of a pair of oscillating arms which are designed to extend forwardly of the gathering platform. In other words, it appears that the primary area for gathering dislodged material is a space on the mining floor forward of the platform with the oscillating arms being required to remove material therefrom for deposit on the gathering platform.

U.S. Pat. Nos. 3,801,157; 3,804,466; and 4,047,762 appear to disclose endless conveyor means which extends forwardly into a gathering platform which is disposed adjacent and below the mining head for the receipt of dislodged material thereon. However, U.S. Pat. Nos. 3,801,157 and 3,804,466 do not include an explanation or specific detail disclosure of the particular means employed for driving the endless conveyors thereof. On the other hand, U.S. Pat. No. 4,047,762 discloses that a separate driving means located rearwardly on the mobile body of the mining machine can be employed as the basic drive for the conveyor.

Accordingly, there remains a need for an efficiently driven and operated endless conveyor means which extends forwardly of the oscillating arms toward the forward edge of a gathering platform to efficiently remove dislodged material therefrom and reduce the work load on the oscillating arms.

SUMMARY OF THE INVENTION

In accordance with the present invention there is provided an improved material gathering device for a mining machine or the like which includes a mobile body supporting a mining head at a forward end thereof for dislodging material from a mine face. A gathering platform on the mobile body is adjacent and below the mining head for receipt of the dislodged material thereon. An endless conveyor extends longitudinally of the mobile body to convey the dislodged material away from the forward end to a rearward end of the mobile body. A pair of oscillating arms on transversely opposite sides of the gathering platform is driven by a single drive means to feed the dislodged material onto the endless conveyor. The improvement includes the endless conveyor having a forward end extending into the gathering platform to terminate near the forward edge thereof. A means for driving the endless conveyor is coupled to the single drive means of the pair of oscillating arms.

Accordingly, the principal object of the present invention is to provide an improved material gathering device for a mining machine or the like which efficiently gathers material dislodged by a mining head from a mine face.

Another object of the invention is to provide an improved material gathering device which utilizes an endless conveyor which extends forwardly into the gathering platform to reduce the work load required on a pair of oscillating arms which feed the dislodged material onto the endless conveyor.

It is still another object of the invention to provide such a material gathering device which employs efficient and convenient drive means for the endless conveyor thereof.

These and other objects of the present invention will be more completely described and disclosed in the following specifications, the accompanying drawings, and the appended claims.

DESCRIPTION OF THE PREFERRED EMBODIMENTS

Figure 1:
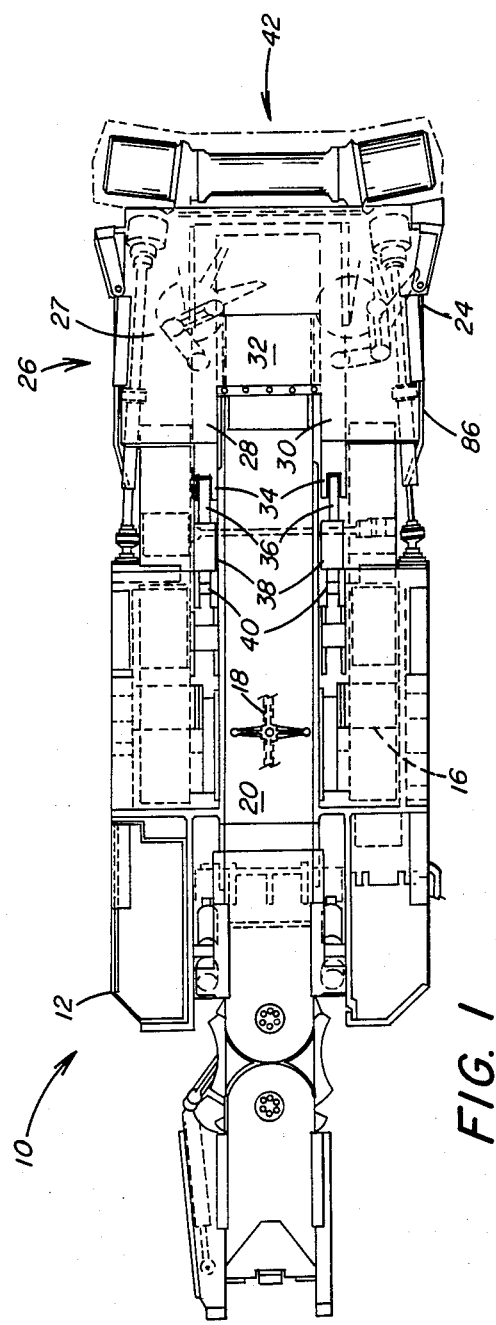
FIG. 1 is a top plan view of a mining machine which includes various features of the invention.
Figure 2:
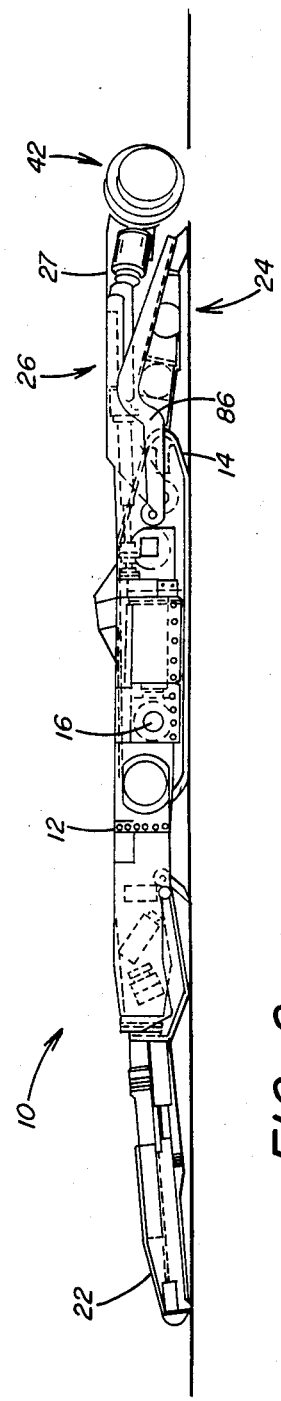
FIG. 2 is a side elevational view of the machine as shown in FIG. 1.

As seen in FIGS. 1 and 2, there is generally illustrated a continuous mining machine 10 that has a body or frame portion 12 suitably mounted on endless crawler tracks 14. An electric motor 16 is provided to propel the mining machine 10 and allow it to be advanced in the mine during the mining operation of dislodging solid material from the mine face. An endless conveyor mechanism 18, which will be discussed in detail hereinbelow, is positioned in a longitudinal trough 20 and conveys dislodged material therein from the front of the mining machine to an articulated rear discharged section 22.

A preferred gathering device 24 extends forwardly from the body portion 12 and is arranged to gather and feed dislodged material into the trough 20 so that the dislodged material can be conveyed rearwardly by the endless conveyor mechanism 18 to the discharged section 22. From the discharged section 22, the loose material is transferred to another suitable material handling device for transportation out of the mine.

A boom member extends forwardly from the body portion 12 and includes a cover plate 27. As seen in FIG. 1, the cover plate 27 extends over the receiving end portion of the conveyor mechanism 18 and the gathering device 24. The boom member 26 includes a pair of parallel rearwardly extending arm members 28 and 30 which are connected at their forward end portions to a housing 32 which extends transversely across the front of the mining machine 10.

Each of the arm members 28 and 30 are pivotally connected at a pivot point 34 to a piston rod 36 of a piston cylinder assembly 38. The pair of piston cylinder assemblies 38 are, in turn, pivotally connected to the mining machine body portion 12 at pivot points 40. With the arrangement, the arm members 28 and 30 of the boom member 26 are pivotally connected to the mining machine body portion 12.

Upon extension and retraction of the piston rods 36 within the cylinder assemblies 38, the boom member 26 is operable to pivot about the pivot points 34 of the arm members 28 and 30 to move the boom member 26 vertically to a position above that illustrated in FIG. 2. A mining head, in the form of a preferred cutter drum assembly 42, is connected to the boom member 26 and performs a shear cut of the mine face to dislodge material therefrom. With the mining machine 10 being mounted on a movable body or frame portion 12, it is capable of advancing forward toward the mine face as the boom member 26 is raised and lowered to cause the cutter drum assembly 42 to dislodge solid material from the mine face by a downward shear cut.

Figure 3:
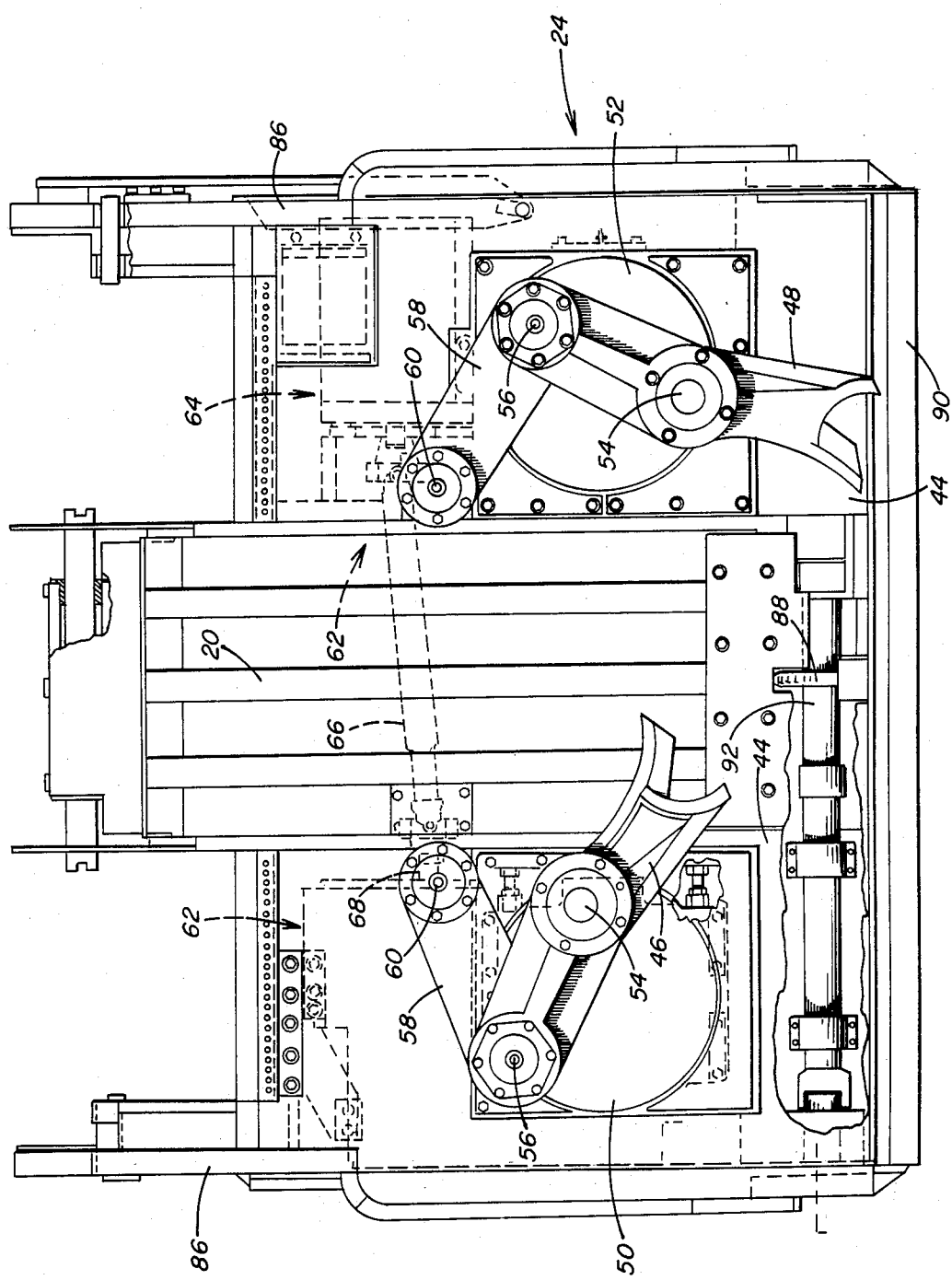
FIG. 3 is an enlarged fragmentary plan view of the preferred gathering platform of the mining machine including various features of the invention.

As seen in FIG. 3, the material dislodged by the cutter drum assembly 42 would be fed onto the gathering device 24 by the forward advancement of the mining machine 10. For the purposes of better demonstrating the various features of the gathering device 24, the boom member 26, cover plate 27, and the endless conveyor mechanism 18 are not shown. The preferred gathering device 24 includes an inclined gathering platform 44 for receipt of the dislodged material thereon. A pair of gathering arms 46, 48 are mounted on transversely opposite sides of the gathering platform 44 with the longitudinal trough member 20 of the endless conveyor mechanism 18 disposed therebetween. The preferred gathering arms 46, 48 might be of any type well known in the mining art but are preferably of the type which oscillate to feed the dislodged material on the gathering platform 44 onto the endless conveyor mechanism 18. Specifically, the preferred oscillating arms 46, 48 are respectfully connected to a pair of disc members 50, 52 that are operably supported on the gathering platform 44. The disc members 50, 52 are caused to rotate by a means which is well known in the mining art including associated ring gears (not shown) which are driven by pinions (not shown) on a common drive shaft 84 (FIGS. 5 and 6) extending transversely of the gathering device 24, which shaft 84 extends transversely across the platform beneath the upper flight of the conveyor and is connected by means of pinions to the ring gears for the disk members 50 and 52. It should be understood, however, that the drive shaft 84 could have a single pinion meshing with the ring gear on disk 50 and a suitably supported auxiliary shaft having a pair of pinions thereon could be positioned between and mesh with the ring gears on disks 50 and 54 to drivingly connect the disks 50 and 52 to each other and to the motor 64. Rotation of the disc members 50, 52 causes transverse pivoting of the oscillating arms 46, 48 toward and away from the conveyor trough 20. Specifically, the arms 46, 48 are connected at a central portion thereof to the rotatable disc members 50, 52 by pins 54. The oscillating arms 46, 48 are also connected at their rearward end portions by pins 56 to link arms 58. The link arms 58 are, in turn, pivotally supported on the gathering platform 44 by pins 60.

Figure 4:
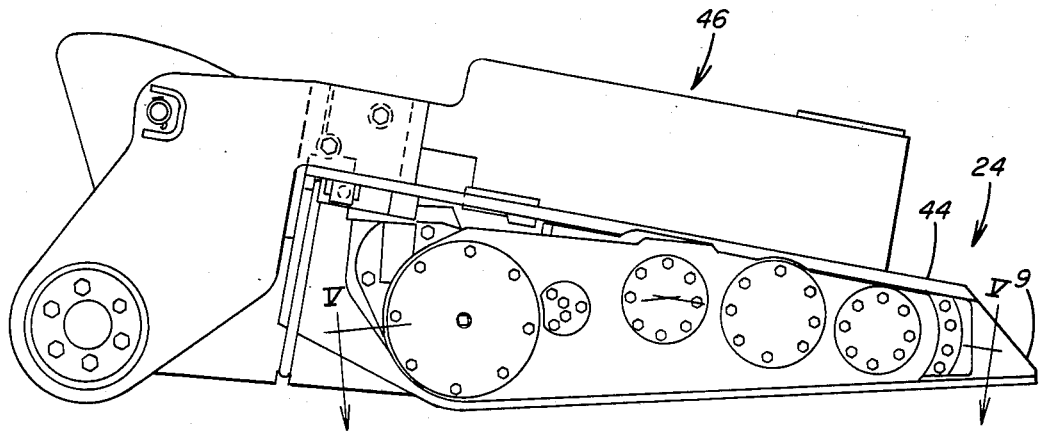
FIG. 4 is a side elevational view of the gathering platform as shown in FIG. 3.
Figure 5:
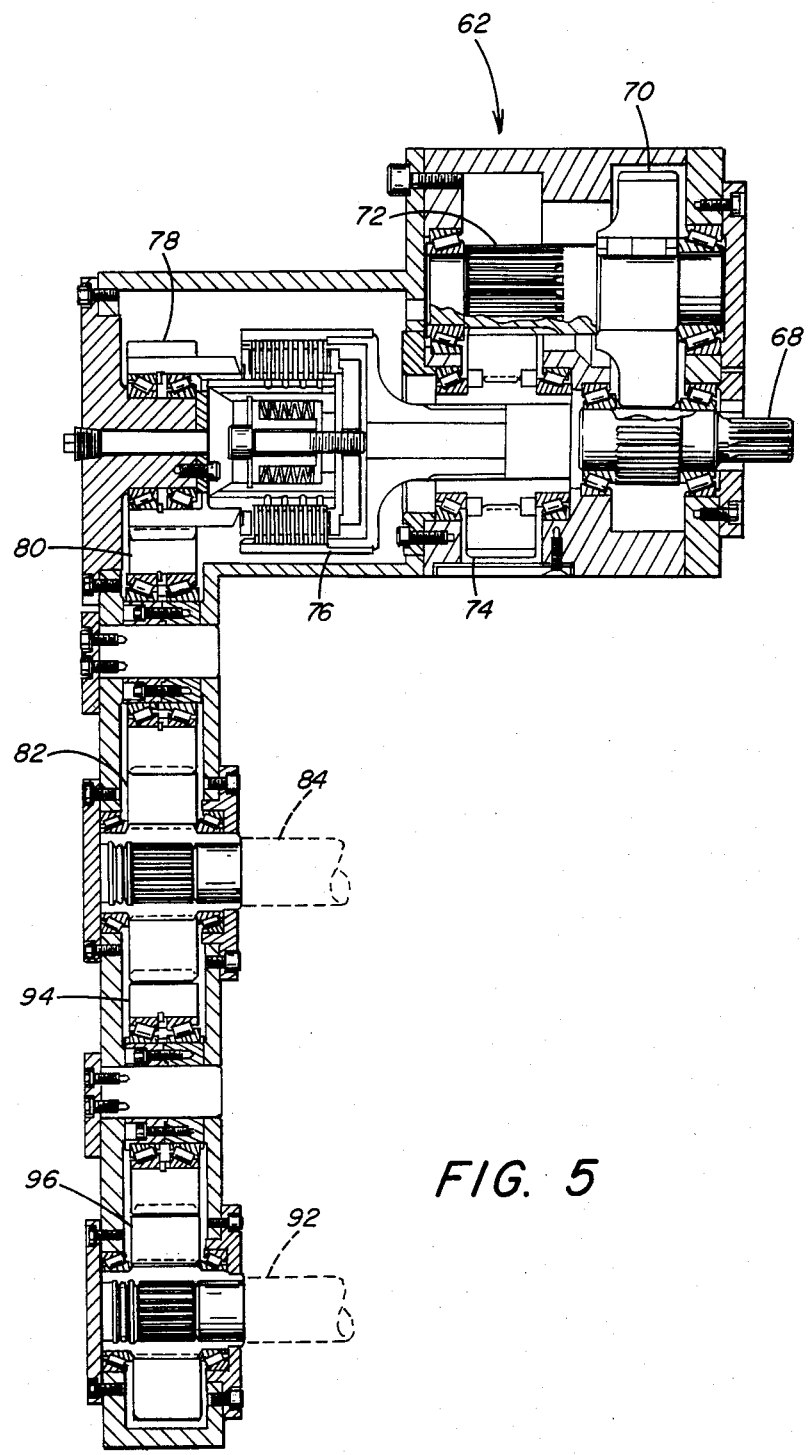
FIG. 5 is a sectional view of the preferred drive system for the preferred oscillating arms and endless conveyor as seen along line 5—5 of FIG. 4.

As seen in FIGS. 3, 4, and 5 the preferred oscillating arms 46, 48 are driven by a preferred drive means 62 which is housed within an interior of the gathering device 24. The drive means 62 includes an electric motor 64 having an intermediate shaft 66 which extends generally transversely across the gathering device 24. The intermediate shaft 66 is joined to an input shaft and gear 68 of a speed reducer which gear 68 is in engagement with a first reduction gear 70 which is rigidly joined to a second reduction gear 72 for rotation therewith. The second reduction gear 72 is in engagement with and drives a clutch input gear 74. The clutch gear 74 is mounted on a clutch cap assembly 76 of a fixed overload clutch which is capable of transmitting rotating force to a spur clutch gear 78. The spur clutch gear 78 engages a spur idler gear 80 which in turn rotates an output gear 82. The output gear 82 basically drives the oscillating arms 46, 48 through a single output shaft 84 as mentioned hereinabove. The output shaft 84 includes the pinions (not shown) thereon which specifically drive the disc members 50, 52.

As thus described, the drive means 62 for the preferred oscillating arms 46, 48 is similar to that used in U.S. Pat. No. 4,296,856. As disclosed therein, the entire gathering device 24 with the drive means 62 therein was mounted on movable arms 86. Additional control means (not shown) enables the gathering device 24 to be raised and lowered relative to the mine floor. More significantly, the output shaft for the oscillating arms in the prior art device of this patent included a drive sprocket centrally located thereon between the oscillating arms which drive sprocket was utilized to power an endless conveyor similar to the endless conveyor mechanism 18. However, because the drive sprocket was located between the oscillating arms on the drive shaft thereof, the forward end of the endless conveyor was not capable of extending into the gathering platform. As a result, it was possible for dislodged material to collect in this area which material could only be removed by the action of the oscillating arms if they were designed to extend into this area or would be allowed to gather thereon if the oscillating arms were not designed to extend into this area.

Accordingly, the improved material gathering device 24 includes an endless conveyor mechanism 18 which is longer and configured to extend to a drive sprocket 88 which is located near a forward edge 90 of the gathering device 24. As a result, the endless conveyor mechanism 18 is capable of extending into the gathering platform 44 near the forward edge 90 thereof to assist in the removal of the dislodged material in the area of concern to reduce the work load on the oscillating arms 46, 48 and insure that the dislodged material will not tend to collect in this area and interfere with continued mining operation.

The preferred means for driving the endless conveyor mechanism 18 includes a conveyor drive shaft 92 on which the drive sprocket 88 is centrally mounted. The conveyor drive shaft 92 extends transversely of the gathering device 24 to be parallel with output shaft 84 and is preferably coupled to the drive means 62 of the pair of oscillating arms 46, 48 as described hereinabove. Utilizing the same drive means 62 is simple and reliable and eliminates the need for additional drive means as was required in some of the prior art patents mentioned hereinabove. Further, since the drive means 62 is fully housed within the gathering device 24, the oscillating arms 46, 48 and the conveyor mechanism 18 will function independent of the angular position of the gathering device 24 relative to the mine floor. Specifically, to provide the drive for the conveyor mechanism 18, a second idler gear 94 is in engagement with the output gear 82 and in turn drives a conveyor drive gear 96. The conveyor drive gear 96 is rigidly coupled to the conveyor drive shaft 92 to cause the endless conveyor mechanism 18 to operate whenever there is operation of the oscillating arms 46, 48.

Figure 6:
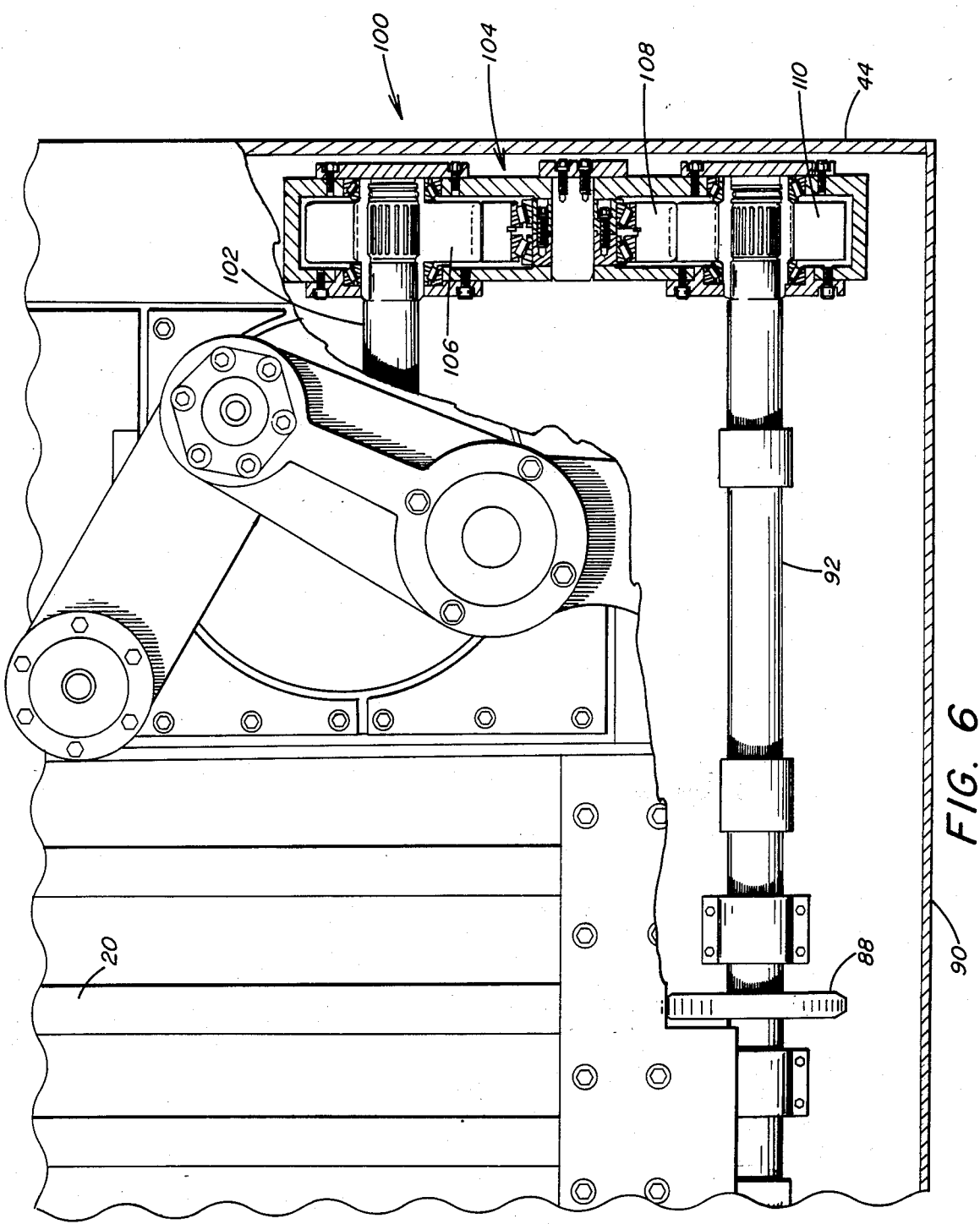
FIG. 6 is an enlarged fragmentary plan view, partially sectional, of an alternative gathering platform of the mining machine including various features of the invention.

As seen in FIG. 6, an alternative material gathering device 100 includes an alternative means for extending the forward end of the endless conveyor mechanism 18 (not shown) into the gathering platform 44 to terminate near the forward edge 90 thereof. Specifically, the means for driving the endless conveyor mechanism 18 is coupled in a different manner to an output shaft 102 which is similar to the output shaft 84 which basically drove the oscillating arms 46,48 as described hereinabove.

The output shaft 102 of the alternative material gathering device 100 is driven by drive means which are similar to the drive means 64 described hereinabove but which do not have the additional gearing as included in the preferred embodiment for operation of the conveyor mechanism 18. In other words, the existing drive means which was heretofore utilized for the oscillating arms 46,48 is again primarily located on one side of the gathering platform 44 (t the left in FIG. 3). The alternative material gathering device 100 preferably utilizes a transfer case 104 which is mounted on the opposite side of the platform 44 (to the right as shown in FIG. 6).

The transfer case 104 includes a transfer gear 106 which is mounted on the end of the output shaft 102 for rotation therewith. The shaft 102 is caused to rotate by the output gear 82 in the manner described hereinabove. A second idler gear 108 is similar to the second idler gear 94 and is in engagement with the transfer gear 106. The second idler gear 108 in turn drives a conveyor drive gear 110 which is similar to the conveyor drive gear 96 described hereinabove. The conveyor drive gear 110 is rigidly coupled to the conveyor drive shaft 92 at an opposite end thereof than had been the conveyor drive gear 96 of the embodiment hereinabove. The engagement of the second idler gear 108 and the conveyor drive gear 110 in this manner again causes the endless conveyor mechanism 18 to operate whenever there is operation of the oscillating arms 46,48.

The embodiment illustrated in FIG. 6 provides an alternate manner for driving the disks 50 and 52 and the conveyor drive shaft 92. The output from the motor 64 is suitably connected to the shaft 102, which in turn is connected by means of ring and pinion gears to the disks 50 and 52. Thus, the motor 64 drives the disks 50 and 52 through the shaft 102. The shaft 102, through gears 106, 108 and 110 drives the conveyor foot shaft 92 positioned along the front of the conveyor platform.

Thus, FIG. 5 illustrates a drive along the right-hand side of the platform as viewed from the rear of the platform and FIG. 6 illustrates a drive from the left-hand side of the platform as viewed from the rear of the platform. The essential feature of both embodiments of the drive is utilizing the drive motor mounted on the platform to first drive the disks 50 and 52 through a driving connection and providing in the gear train an idler gear meshing with the transfer gear associated with the disk members. The idler gear then meshes with the conveyor drive gear mounted on the conveyor shaft. This permits the conveyor foot shaft to be located adjacent the front edge of the platform, as previously discussed.

Clearly there may be alterations made to the preferred embodiment without departing from the invention as claimed. For example, there are numerous types of oscillating and gathering arms which could equally be employed which arms use a single form of drive means for their operation. Additionally, other means could be utilized to couple the means for driving the endless conveyor to the single drive means of the oscillating arms while still satisfying the various objects of the present invention.

I claim:

1. An improved material gathering device for a mining machine of the type which includes a mobile body supporting a mining head at the forward end thereof for dislodging material from a mine face, a gathering platform on said mobile body adjacent to and below said mining head, said gathering platform arranged to receive material dislodged by said mining head thereon, and endless conveyor extending longitudinally along said mobile body to convey said dislodged material away from said forward end to a rearward end of said mobile body, and a pair of oscillating arms on opposite sides of said gathering platform to feed said dislodged material onto said endless conveyor, said improvement comprising, a drive motor for driving said pair of oscillating arms and for driving said endless conveyor, a first transverse shaft drivingly connected to said pair of oscillating arms, a first gear drivingly connected to said first transverse shaft, said drive motor drivingly connected to said first gear, said endless conveyor having a forward end extending onto said gathering platform and terminating near a forward edge thereof, and a transversely extending conveyor drive shaft positioned parallel with said first shaft and forwardly thereof, said conveyor drive shaft drivingly connected to said first gear.

2. An improved material gathering device as set forth in claim 1, which includes, an idler gear meshing with said first gear and with a conveyor drive gear mounted on said conveyor drive shaft.

3. An improved material gathering device for a mining machine which includes a mobile body supporting a mining head at the forward end thereof for dislodging material from a mine face, a gathering platform on said mobile body adjacent to and below said mining head, said gathering platform arranged to receive dislodged material thereon, an endless conveyor extending longitudinally of said mobile body to convey said dislodged material away from said forward end to a rearward end of said mobile body, a pair of oscillating arms on opposite sides of said gathering platform, said oscillating arms arranged to feed said dislodged material onto said endless conveyor, said improvement comprising, a drive motor mounted on and movable with said platform, a first shaft drivingly connected to said drive motor and extending transversely of said mobile body between said pair of oscillating arms, a first gear coupled to said first shaft, a conveyor drive shaft positioned parallel to said first shaft and forwardly thereof toward said forward end of said gathering paltform, and other gear means connecting said first shaft and said conveyor drive shaft.

4. An improved material gathering device as set forth in claim 3, wherein said gear means includes an idler gear meshing with said first gear and a conveyor drive gear mounted on said conveyor drive shaft and meshing with said idler gear.

* * * * *